United States Patent

[11] 3,582,895

[72] Inventors Paul Abramson
Yorktown Heights;
George R. Stilwell, Jr., West Nyack, both of, N.Y.
[21] Appl. No. 791,292
[22] Filed Jan. 15, 1969
[45] Patented June 1, 1971
[73] Assignee International Business Machines Corporation
Armonk, N.Y.

[54] ALPHANUMERIC PARALLEL TONE, SEQUENTIAL CHARACTER SYSTEM, METHOD, AND APPARATUS
21 Claims, 5 Drawing Figs.

[52] U.S. Cl. 340/171PPF
[51] Int. Cl. H04q 9/00
[50] Field of Search 340/171; 179/84 VF, 90 K

[56] References Cited

UNITED STATES PATENTS

| | | | |
|---|---|---|---|
| 3,128,349 | 4/1964 | Boesch et al. | 340/171XR |
| 3,140,357 | 7/1964 | Bischof et al. | 179/84VF |
| 3,281,790 | 10/1966 | Roscoe | 340/171 |
| 3,488,451 | 1/1970 | Nenninger et al. | 179/90K |
| 3,515,806 | 6/1970 | Spraker | 179/90K |

*Primary Examiner*—Donald J. Yusko
*Attorneys*—Hanifin and Jancin and Graham S. Jones, II

ABSTRACT: An alphanumeric system, method, and apparatus includes a parallel tone transmitter, a parallel tone receiver, each having a conventional telephone frequency type of A and B or parallel tone oscillators, and a splitter of tones from the receiver. An A tone will last for an interval long enough to assure protection against response to spurious tones such as voice signals, but may change frequency during the character period. When the A tone is constant during a complete character period, the B tone will not last as long as the A tone, but will change frequency after a set interval, for an A–B–B sequential, alphanumeric code, during the character period for each character. Alternatively, both the A and B tones are changed to provide an A–A–B–B sequential code for each character. The audio tones employed are standard, avoid intermodulation error, and the system maintains voice protection, while increasing the number of alphanumeric characters for a period of fixed length.

INVENTORS
PAUL ABRAMSON
GEORGE R. STILWELL, JR.

BY Graham S. Jones II
ATTORNEY

ALPHANUMERIC PARALLEL TONE, SEQUENTIAL CHARACTER SYSTEM, METHOD, AND APPARATUS

BACKGROUND OF THE INVENTION

This invention relates to parallel tone transmission methods, systems and apparatus. This invention also relates to parallel tone transmission systems for use with nonlinear devices, with voice protection, and provides compatibility of alphanumeric systems with commercially available numeric systems.

DESCRIPTION OF THE PRIOR ART

The introduction of Touch-Tone telephone dialing provided a means of manually keying numeric information into a data handling system. The parallel tone technology employed has found other applications due to its simplicity, economy and compatibility with the telephone voice circuits. Devices using commercial parallel tone equipment, transmit numeric punch card data from remote terminals to a central punch. Initially, the transmission code was limited to a set of 16 characters. One out of four "A" tones and one out of four "B" tones are transmitted simultaneously, producing one out of a set of 16 combinations. For Touch-Tone dialing only 12 of the 16 combinations are used. Those tones are listed as follows in Table I:

TABLE I

| | | | |
|---|---|---|---|
| A–1 | 697 CPS | B–1 | 1209 CPS |
| A–2 | 770 CPS | B–2 | 1336 CPS |
| A–3 | 852 CPS | B–3 | 1477 CPS |
| A–4 | 941 CPS | B–4 | 1633 CPS |

Requirements for alphanumeric capabilities arose and many systems were designed which used the Touch-Tone phone to produce alphanumeric codes. They were generally unsatisfactory, since they required the user to push two or more Touch-Tone keys to produce an alpha character. A parallel tone system was developed which transmitted the simultaneous combination of an A tone, a B tone, and a C tone. Since each particular tone was "one-out-of-four," a total set of 64 combinations was made available. Four well-known commercial values for C tones C–1 to C–4 are C–1: 2050 c.p.s.; C–2: 2150 c.p.s.; C–3: 2250 c.p.s.; and C–4: 2350 c.p.s. A receiving data set was provided for detecting these tones. A data processing card transmitter and other similar machines soon took advantage of these alphanumeric capabilities and some could transmit alphanumeric card data to a central punch.

An additional method of using a parallel tone data input system is that of acoustically coupling the audio tones to the mouthpiece of a telephone. To accomplish this, a keyboard is required which is capable of actuating oscillators of the proper frequencies. These signals are then amplified, and by means of an acoustic transducer, converted to audio. Through the use of an acoustic coupler, the signal can be applied to the mouthpiece of a telephone.

Acoustic coupling of parallel tone data transmission has been successfully accomplished for numeric information using the sets of A tones and B tones. Small, portable, battery-operated keyboards with appropriate electronic circuits have been constructed and used in a number of studies. Alphanumeric portable systems including keyboards, electronics, and acoustic couplers using the A–B–C system have also been constructed and tested. These latter devices, however, have tended to produce errors, for reasons described below.

Instead of acoustic coupling, inductive coupling of the parallel tone signals may be used. This method of coupling is equal to or superior to acoustic coupling in most respects, and is more economical. Disadvantages are that inductive coupling uses more battery power, and more importantly, some telephones use a piezoelectric earphone, so that there is no coil to which to couple.

Parallel tone transmission has proved to be very successful for the purpose for which it was originally designed, that of Touch-Tone dialing. In addition, as a means of remote computer input for numeric information, it has also been adequate. But the requirement for alphanumeric capability and the development of the C-tones produced a number of problems.

The majority of problems associated with C-tones are basically caused by beat frequencies or heterodyning. As will be discussed later, under certain conditions, if two or more frequencies are present, additional frequencies are generated. These spurious frequencies are the sums and differences of any pair of original frequencies, as well as harmonics of the original frequencies. Under some conditions, harmonics of the sums and differences are also generated.

Looking in Table I at the frequencies of the tones (A and B) it is apparent that the A and B tones were selected differently than the C-tones which are listed above. The A and B tones are odd frequencies and were selected very carefully such that no harmonic of an A tone falls within the passband of any B tone filter. Also, no combination of any A tone with any B tone will produce a beat frequency or harmonic of a beat frequency which falls within the passband of any A or B tone filter. These characteristics of the selected frequencies meant that there is a large degree of immunity to errors which might be caused by nonlinear elements, somewhere in the transmission link, between the transmitting keyboard and receiving data-set output.

When the C tones were introduced, no "good" set of frequencies could be found which met the requirements (which the A and B frequencies met) with regard to harmonics and beat frequencies. It can be seen that the C tone frequencies are even numbers, exactly 100 cycles apart. As a result, data characters which are transmitted as a combination of an A tone, a B tone, and a C tone, are subject to errors. These errors generally take the form of spurious tones being generated, particularly where a nonlinear device is present somewhere in the data transmission link. For example, consider the case of an alphanumeric receiver into which someone dials the number 6 from an ordinary Touch-Tone telephone. The usual conventional code for number 6 is A–2 and B–3 which are the frequencies 770 and 1477 cycles per second. If any nonlinearity is present in the communication link, the sums and differences of these frequencies will be generated. In this case, the sum is 2247 and the difference is 707. Note that frequency for tone C–3 is 2250 c.p.s. so that the C–3 circuit will probably be activated. This will produce the code A–2, B–3, C–3 which is the usual code for the letter F. In addition, if the nonlinearity is large enough, a spurious A–1 (697 c.p.s.) will be triggered by the spurious difference frequency of 707 (1477 minus 770 or B–3 minus A–2). However, here the difference is 10 c.p.s. rather than only 3 c.p.s., and the percentage difference is 1.3 percent rather than 0.13 percent.

Another example would be the case where the alphanumeric character "D" is transmitted. The usual code is A–2, B–1, C–3. In this case, the difference frequency between C–3 and A–2 (2250—770) is 1480 which is only three cycles away from 1477 c.p.s. or B–3. The result would be an additional, spurious B–3 if any nonlinearity were present.

In summary, there are three types of errors which may be caused by codes using C tones in the presence of transmission nonlinearities. First, there is the case of transmitting codes containing *only* A tones and B tones to a system which is intended to receive alphanumeric codes containing C tones. Spurious C tones will frequently be generated causing errors in code meaning.

Secondly, there is the case of transmitting alphanumeric codes containing C tones to a system which is adapted to receive only numeric data consisting of A tones and B tones. In this case, combinations of A tones and C tones, or B tones and C tones may produce spurious A or B tones, and consequently errors.

Third is the case of transmitting alphanumeric codes containing C tones to a system adapted to receive alphanumeric codes containing C tones. Since this is the normal condition for alphanumeric data transmission, it is very unfortunate that even here, the combination of C tones and A or B tones will produce spurious frequencies, and serious code errors when nonlinear elements are present in the transmission link.

In the above discussion of C tone errors, it was pointed out that such errors occur primarily when a nonlinear device is present in the data transmission link. In general, we find that there are three main sources of nonlinearities in the telephone system.

The first source of nonlinearity is the basic telephone network which includes the telephone hybrids, any intermediate amplifiers, the switching network, and the particular receiver which is used. This source of nonlinearity is rather small, and errors attributable to it are infrequent. These errors usually appear when transmitting a numeric (A tones and B tones) code to an alphanumeric receiver, or an alphanumeric code (A tones, B tones, and C tones) to a numeric receiver. Generally, the transmission of an alphanumeric code (using commercial data-telephone equipment) to an alphanumeric receiver over a hard copper line network (as distinguished from a carrier system) is satisfactory.

The second source of nonlinearity occurs when the distance between the transmitter and receiver is such that the telephone signal passes through a carrier system. Without going into detail regarding the various types of carrier systems which are commonly used, it has been found that carrier systems significantly increase the amount of nonlinearity, and, consequently, the number of errors which the C tones introduce.

The third and possible greatest source of nonlinearity is the use of an acoustic coupler. In this case, no transmitting data set is used. Instead electronic oscillators capable of producing A tones, B tones, and sometimes C tones are part of the keyboard.

Since the acoustic coupling of parallel tone data requires that the tones first be generated as audio signals, and then reconverted to electrical signals by the microphone of the telephone instrument, the well-known nonlinearities of the acoustic transducer (loudspeaker) and the acoustic converter (microphone) appear in the transmission link. These nonlinearities plus the effect of a chamberlike device which holds the acoustic transducer next to the telephone cause a sufficiently high probability of error when C tones are used to generally eliminate acoustic coupling for general purpose use in alphanumeric parallel tone transmission.

A fourth source of nonlinearity and error potential is the use of the inductive coupler. Although this means for coupling is not nearly as nonlinear as acoustic coupling, it does produce some error potential. This error potential is primarily attributable to the fact that inductive coupling as well as acoustic coupling, is used, most frequently, in portable systems in which battery power and efficiency are of major concern. Since the inductive coupler is very loosely coupled to the telephone, the efficiency of energy transfer is very low. This requires output amplifiers (for the tones) of substantially higher power than in the case of acoustic coupling, with the consequent larger battery drain. The resulting engineering compromise generally provides for a somewhat higher current drain and lower signal level. The nonlinearity arises from distortion in the output amplifier. The combined error potential attributable to nonlinearity and the lower signal-to-noise ratio is significantly less than in the case of acoustic coupling.

One solution which as been suggested to the problem of increasing the number of characters would be to double the data rate. However, studies have shown that the human voice and other acoustic sources, such as crosstalk and music produce unwanted chords which could be misinterpreted as characters by a parallel tone system operating over a channel which is open to such signals, such as a telephone line. It is also observed that the syllabic period of speech is normally 35—40 milliseconds in length. In general, musical chords last a similar length of time. However, as a result, it is desirable to maintain the period of the shortest character of a parallel tone transmission system larger than the syllabic period of 40 milliseconds as a means of "voice protection." Voice protection is intended to refer herein to protection against any unwanted continuous wave tones.

The problem of voice protection has existed since it was suggested that Touch-Tone signals may be used for data transmission. Basically, the problem results from the fact that the frequencies which are used in Touch-Tone "dialing" may be generated by the human voice while speaking normally into a telephone. Consequently, if a telephone is to be used for data transmission, some means of eliminating errors attributable to misinterpretation of such signals as "parallel tone" signals is desirable.

A method for eliminating the voice problem is provide a switch on the telephone instrument which disconnects the microphone from the line when data is being transmitted. This is done in the case of some transmitting data telephone sets. The tones which represent the data are generated in the data set or in the telephone instrument in the case of an ordinary Touch-Tone phone. The electrical signals representing the tones are then connected directly to the telephone line. When an ordinary Touch-Tone telephone is used for transmission of data, no switch is present and any voice noise enters the system directly. For this purpose, a special receiving set which provides circuitry for eliminating the voice errors is available.

In the case of portable systems where the oscillators must be incorporated as part of the keyboard, the tones are introduced into the telephone system via acoustic or inductive couplers. The acoustic coupler converts the electrical tones into audible sounds and is held close to the microphone of the telephone system. Since the microphone is used, it obviously may not be disconnected from the system and is capable of picking up spurious sounds as well as ordinary speech.

When the inductive coupler is used, the situation is somewhat better. Since this coupler uses the speaker or "hearing end" of the phone, the microphone may be completely covered or even removed so that no voice enters the system. A very small amount of voice may be picked up by the earphone end of the telephone.

SUMMARY OF THE INVENTION AND OBJECTS

An object of this invention is to provide a parallel tone transmission system which will provide an increased alphanumeric character capacity with a restricted group of parallel tone audio frequencies.

Another object of this invention is to provide an alphanumeric parallel tone transmission system compatible with commercially available parallel tone numeric telephone transmission systems.

An object of this invention is to provide a multiple tone transmission system whereby protection against response to voice and music can be provided and at least one of the tones can be varied to permit transmission or more characters within the minimum interval of time required for voice protection.

Another object of this invention is to provide an audio tone transmission system suitable for voice grade telephone lines in which alphanumeric transmission with voice protection and without error attributable to false harmonics and intermodulation products is provided.

A further object of this invention is to permit optimum parallel tone transmission in which the level of nonlinear distortion produced by present commercial equipment will be acceptable.

In order to overcome the problems involved in alphanumeric parallel tone data transmission, a new system has been developed. This new system is known as the "A–B–B" or the "$\pi$–A–B–B" system as compared with the old system known as the "A–B–C" system. The A–B–C system was described above.

Since it was the use of the C tones in the original A–B–C system which caused the higher probability of errors under certain conditions, an alternative system for alphanumeric data has been developed which does not use C tones. This A–B–B system transmits a parallel tone character consisting of an A tone (one out of four) and a B tone (one out of four).

After say, 30 ms. the B tone changes to another B tone with the A tone remaining as before. This scheme produces 48 different combinations, as will be obvious (16×3). In addition, 16 other combinations are produced in which the first B tone is the same as the second B tone, (16×1).

C-Tone Errors

Since the A–B–B system does not use C tones for generating the alphanumeric codes, errors and problems, discussed above do not occur. Especially significant is the fact that since only A and B tones are used, relatively large amounts of nonlinearity and distortion in the transmission path may be tolerated without the generation of additional spurious tones.

Acoustic and Inductive Coupler

For portable keyboards with internal oscillators the A–B–B system is especially advantageous, since acoustic or inductive couplers must be used. As discussed above, such couplers (especially the acoustic coupler) introduce nonlinearity into the system. With the A–B–B system this does not produce such errors.

Numeric Subset

As was discussed above, an alphanumeric system using A, B and C tones, precludes the use of a parallel tone, pushbutton telephone for the numeric subset, since spurious C tones would be generated by the A and B combination. (The example given showed that the numeric "6" which is A–2 and B–3 would be transformed into alphanumeric "F" in the presence of any nonlinearities.) This is a serious problem since many applications require a mix of alphanumeric terminals with numeric terminals. Since the numeric terminal requirement could be satisfied by a Touch-Tone telephone, it would be desirable if the numeric codes were compatible with the alphanumeric. The A–B–B system provides this compatibility. If A–B–B codes are employed and the 16 A–B–B codes in which the B tone is at the same frequency as the second B tone are properly assigned to the numbers, the Touch-Tone telephone and the numeric part of the alphanumeric keyboard become fully compatible.

Data Telephones

In the discussion of the A–B–B system earlier, data telephones were mentioned as one means of generating the tones, and a means of connecting them to a telephone line. Actually, all that is required for the A–B–B system is to be able to connect the alphanumeric keyboard and its associated electronics to the oscillators of an ordinary parallel tone, pushbutton telephone.

Lower Cost Portable Unit

It is expected that a small, light, portable battery-operated alphanumeric keyboard with either an acoustical or inductive coupler will be a highly desirable product. The A–B–B system, in addition to the advantages listed above, permits low manufacturing cost since it requires only two multifrequency oscillators (A tones and B tones) rather than three oscillators, for A tones, B tones, and C tones. Since these oscillators are precision circuits they represent s significant portion of the cost of the electronics of the keyboard.

An additional potential savings due to the use of only A and B oscillators, is the integrated circuit which is coming into use in currently available pushbutton parallel-tone switching-signal telephones. Integrated circuits which provide A and B tones are currently manufactured by a number of manufacturers. They are expected to be manufactured in extremely large quantities for use in telephones. Such a circuit is useful only in the case of the A–B–B system since it does not produce C tones, and a system which used the integrated circuit to produce A and B tones, plus a conventional L-C oscillator for C tones would be an undesirable kind of hybrid.

Lower Cost Receiver

Another potential advantage of the A–B–B relative to the A–B–C system, is that the receiver may be significantly less expensive. There are two reasons for this. One is the obvious elimination of the C tone filters, devices which are precise in frequency, as well as in "Q."

A second and potentially greater source of savings in the receiver, is the ease with which voice elimination bay be accomplished. Since the A–B–B signal is significantly more complicated than the A–B–C signal, it is easier to device schemes to distinguish it from normal voice signals.

The forgoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
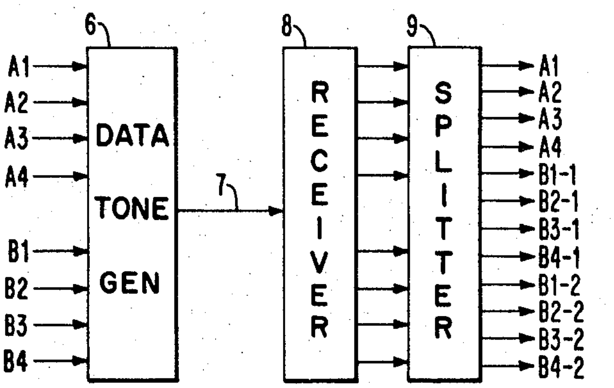
FIG. 1 shows the relationship between a transmitter, a receiver, and a splitter in an A–B–B parallel tone transmission system in accordance with this invention.

FIG. 1 shows a partial system diagram of a parallel tone transmission system employing the A–B–B parallel tone transmission scheme described above. Four A tone inputs A–1 to A–4 and four B tone inputs B–1 to B–4 are connected to a data tone generator 6 connected as by a telephone link 7 to a parallel tone receiver 8 which provides eight outputs comprising two sets of four each to a splitter 9 which checks for A tones and passes them through and separates the two sequential B tone sets B–1–1 to B–4–1 and B–1–2 to B–4–2. The suffixes 1 and 2 to the sets B–1 to B–4 refer to sequence of reception of the B tones with set 1 first and set 2 second. The second set or B–1–2 to B–4–2 outputs are analogous to C tones with the exception that they are later in sequence than the first set or B–1–1 to B–4–1 tones in transmission of any particular character. A circuit for providing the inputs A–1 to A–4 and B–1 to B–4 in proper sequence is shown and described in FIG. 2.

Figure 2:
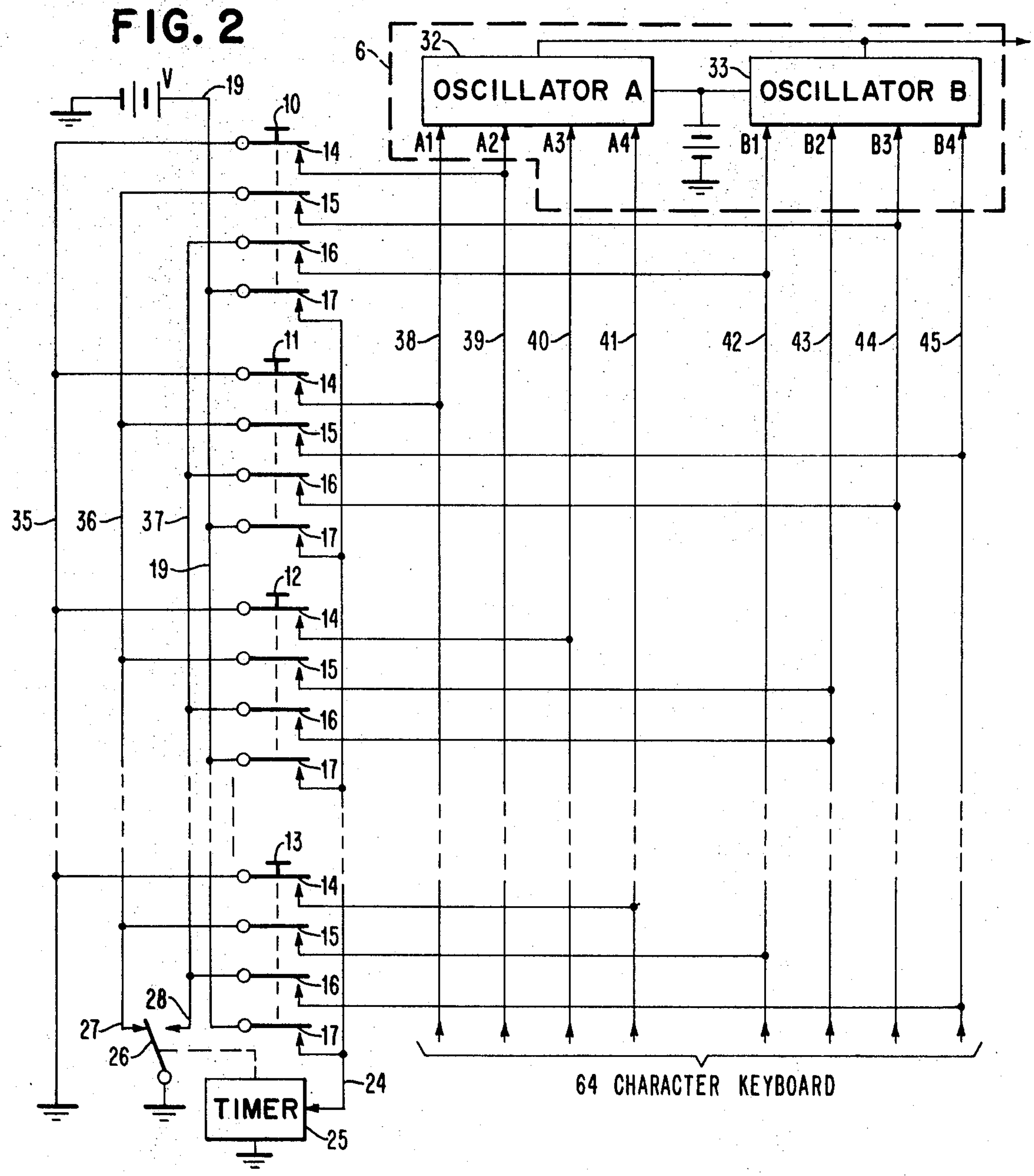
FIG. 2 shows key operated switches for operating a pair of parallel tone oscillators in a transmitter for A–B–B tone transmission in accordance with this invention.
Figure 3:
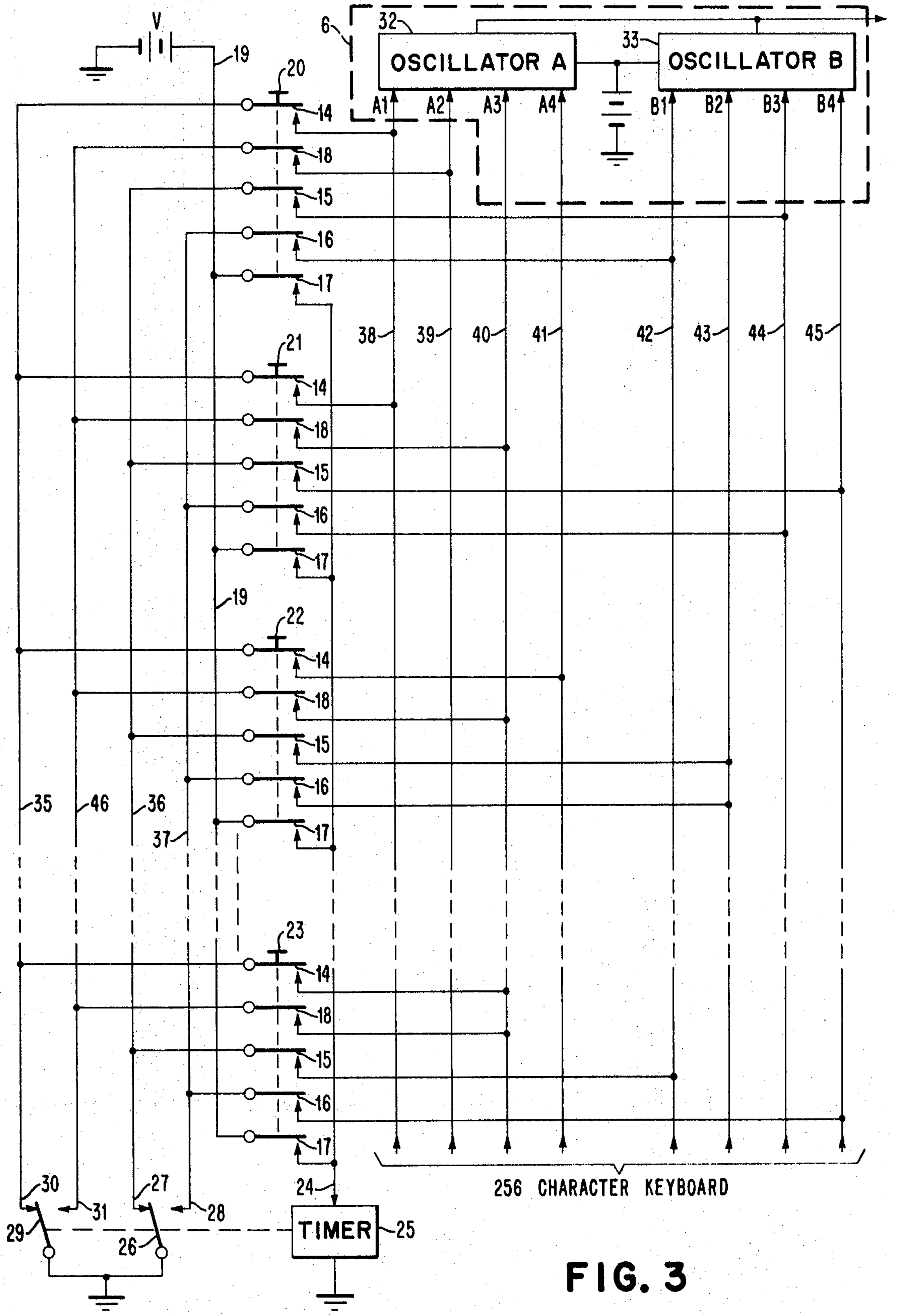
FIG. 3 shows a modified form of the transmitter of FIG. 1 for A–A–B–B tone transmission.

FIG. 2 shows a section of a keyboard for generating A–B–B tones. A plurality of character key switches 10. 11, 12, 13, inter alia, are each ganged to four position contacts 14, 15, 16 and 17 for each character in the set. FIG. 3 shows a corresponding section of a keyboard for generating A–A–B–B tones. A plurality of character key switches 20, 21, 22, 23 are each ganged to five contacts 14, 18, 15, 16 and 17.

Upon actuation of a character key switch such as 10, a contact 14 in FIG. 2 will connect one of four inputs A–1 to A–4, to oscillator A,32, to ground. Oscillator A,32, and oscillator B,33, are shown here as being included in a commercial data telephone and tone generator 6, known commercially as a Data Phone.

The first set of contacts 14 of each character switch, when closed will cause one of the four "A" busses 38—41 to be connected to ground via line 35. Grounding a particular A bus 38—41 will cause the respective frequency to be produced by oscillator A,32.

The fourth pole of each character key switch 10—13 operates a 30 ms. timer 25 whose output is a single pole double throw ground transfer switch having a blade 26, a first contact 27 connected via line 36 to second character switch contacts 15 and a second contact 28 connected via line 37 to third character which contacts 16 of the character key switches 10, 11, etc. Before a character key switch 10—13, etc. is operated, and for 30 ms. thereafter, the ground transfer timer switch 25 grounds the second contact 15 of the character switches 10—13. After the 30 ms. duration, the third contacts 16 of key switches 10—13 are connected to ground, and the second contacts 15 are disconnected from ground by blade 26. The third and second sets of contacts 16 and 15 respectively connect ground to one or two "B" busses 42, 43, 44, 45. For example, in the case of character key switch 12 both contacts 15 and 16 connect to the same bus, which is B–2 bus 43. In this way, operating one of the four character key switches 10, 11, 12, 13, etc., energizes an A tone, a first B tone for 30 ms. and a second B tone for as long thereafter as the switch is operated.

In FIG. 3, the difference in structure is that that each of the character key switches 20. 21, 22, 23 has five contacts which are the same with the addition of contact 18 to those for switches 10 etc. in FIG. 2. Contacts 18 are connected to provide grounding of busses 38—41 of A tone generator 32 during the second half of a character generation interval after timer 25 has switched blade 29 from contact 30 connected to line 35 (and contacts 14) to contact 31 connected to line 46 (and contacts 18). Thus, an even larger alphabet of A–A–B–B parallel-sequential tones can be generated which with repetition of tones would be $(16)^2$ or 256 characters or, without repetition of tones, would be 144.

Actually, two different output schemes are possible. One requires an output set which is compatible with a telephone including oscillators with external input connectors as shown. In this case, output wires from the transmitter board must be energized, which in turn cause the particular frequencies in the telephone oscillators to be generated and connnected to the telephone line.

The other output is adapted for use when an acoustical coupler is to be used; i.e., when a completely portable keyboard is required. In this case, oscillators would be provided with the keyboard and the output busses (for the A and B tones) must be compatible with the circuit requirements of the oscillators.

The circuits of FIGS. 2 and 3 are capable of operating with both a commercial tone generating telephone or on local portable oscillators and an acoustical or inductive coupler.

Receiver and Splitter

A receiver which can be used for the A–B–B system is the same type of data telephone as is used for the A–B–C system except that the "C" outputs are not used. The output of such a telephone consists of 12 relay contacts, four each for the A tones, B tones, and C tones. Actually, there are three additional relay contact outputs for A–0, B–0 and C–0. These contacts are not used in the A–B–B system, and may be disregarded.

For use with an A–B–B system, the eight A and B tone outputs are connected to a decoder circuit which splits or decodes them and presents three sets of outputs for interfacing with other equipment which is adapted to receiver A, B, and C outputs.

Figure 4:
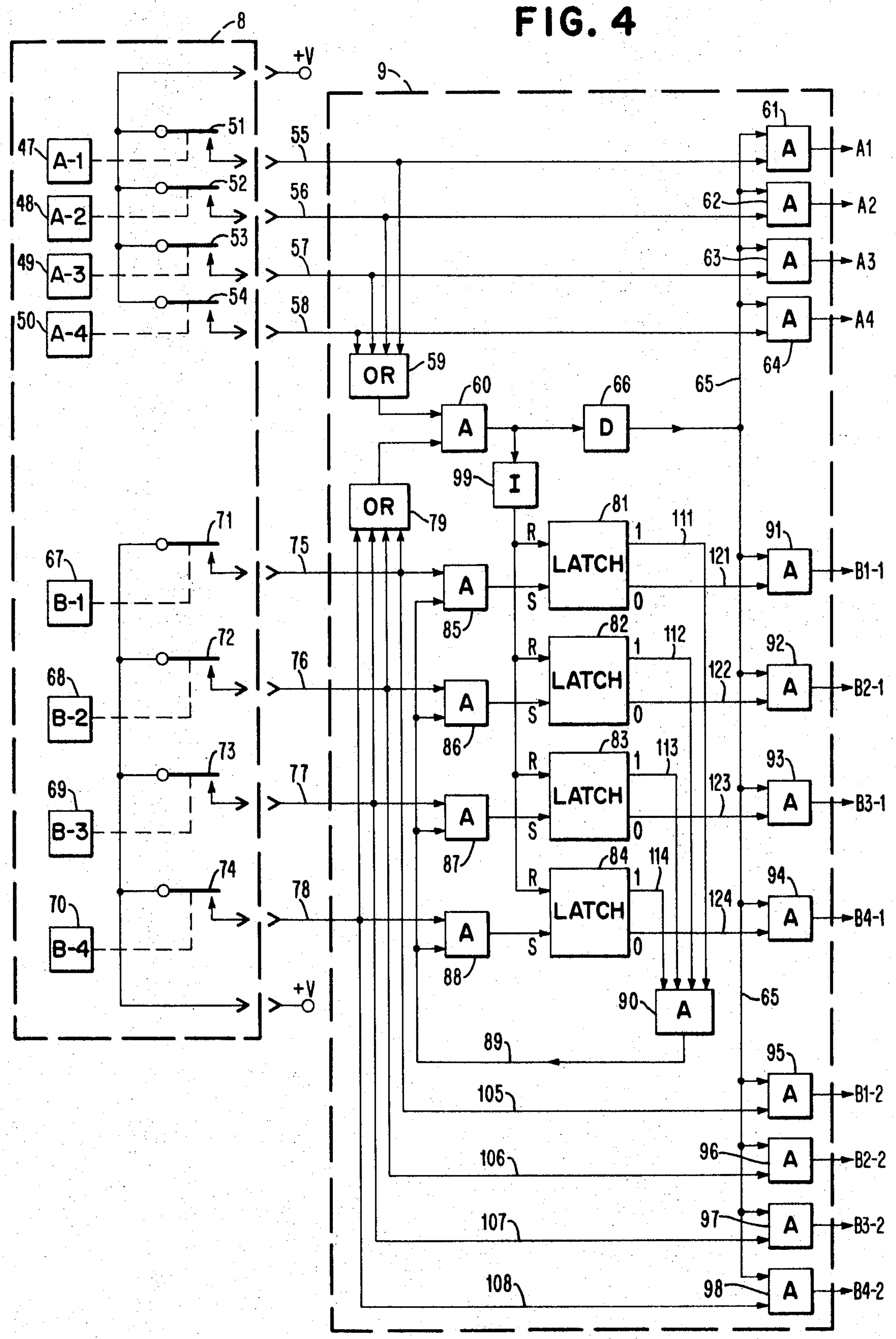
FIG. 4 shows a splitter for connection to the output of a parallel tone receiver for splitting A–B–B tones in accordance with this invention.

FIG. 4 shows a schematic block diagram of a splitter of decoder circuit, the operation of which is described below. In FIG. 4, a receiver data set 8 having four actuators 47, 48, 49 and 50 connected to close contacts 51, 52, 53, 54 is shown for producing an A tone output by connecting voltage +V to one of the lines 55, 56, 57, 58 of splitter 9 when one of the tones A–1, A–2, A–3, and A–4 respectively is received by receiver 8.

Similarly, actuators 67, 68, 69, 70 are connected to close one set of the contacts 71, 72, 73 and 74 for connecting voltage +V to one of the lines 75, 76, 77 and 78 as one of the tones B–1, B–2, B–3, and B–4 is received by receiver 8.

Lines 55—58 are connected to AND's 61—64 which provide outputs A–1 to A–4 when line 65 carries an output from delay circuit 66 indicating that a tone A–B–B parallel tone response has been detected by the splitter 9. Delay circuit 66 is employed to assure continuity of application of an A tone and a B tone for a predetermined period of time, on the order of 50 milliseconds to assure a full A–B–B input and voice protection.

The input to delay 66 is from AND 60 which requires one A tone input to OR 59 and one B tone input to OR 79 from lines 55—58 and 75—78 respectively. Even if a hiatus between reception of B tones should occur at the input of receiver 8, then the overhang of the output from the receiver 8 will, in general, assure that there will be continuity of B tones at OR 79.

There are four latches 81—84 associated with the four B input lines 75—78 such that when a first B input occurs, it operates its respective latch 81—84, if AND units 85—88 are enabled by an input on line 89 from AND 90. Once any latch is operated, AND 90 is disabled as a "1" input via a line 111—114 from a latch 81—84 terminates and AND's 85—88 are disabled so that the second B input cannot operate a latch, and appears via lines 105—108 at the output of splitter 9 as a pseudo - "C" or B–1–2 to B–4–2 on the outputs from AND's 95—98, when they are enabled by line 65.

AND's 61—64 for tones A–1 to A–4, AND's 91—94 from latches 81—84 for tones B–1–1 to B–4–1 and AND's 95—98 for tones B–1–2 to B–4–2 all have an input from delay unit 66 via line 65, so that at the end of the delay, all AND's are prepared to provide outputs for the three A–B–B tones corresponding respectively to the inputs in sequence on lines 55—58 and 75—78.

At the end of the AND 60 output, the inverter I,99, will produce a reset input to all of the latches 81—84 so that they will all produce "1" outputs on lines 111—114 to AND 90, indicating that the splitter 9 is ready to receive a B–*n*–*n* tone, where *n*=1, 2, 3, 4, and the ANDS 85—88 are enabled to operate in response to a B input on lines 75—78.

Inverter 99 connected to the output of AND 60 operates to assure that if the output of either the A tone detecting OR 59 or the B tone detecting OR 79 should end, that the latches will all be reset, the delay 66 will have to be restarted and the splitter 9 will be reset. Thus, an A tone and a B tone input from the receiver must be applied to the splitter 9 at all times, or the system will be reset to its initial position. Accordingly, false inputs are less likely to create an inaccurate set of output signals on lines A–1, B–1–1 to B–4–1, and B–1–2 to B–4–2.

Figure 5:
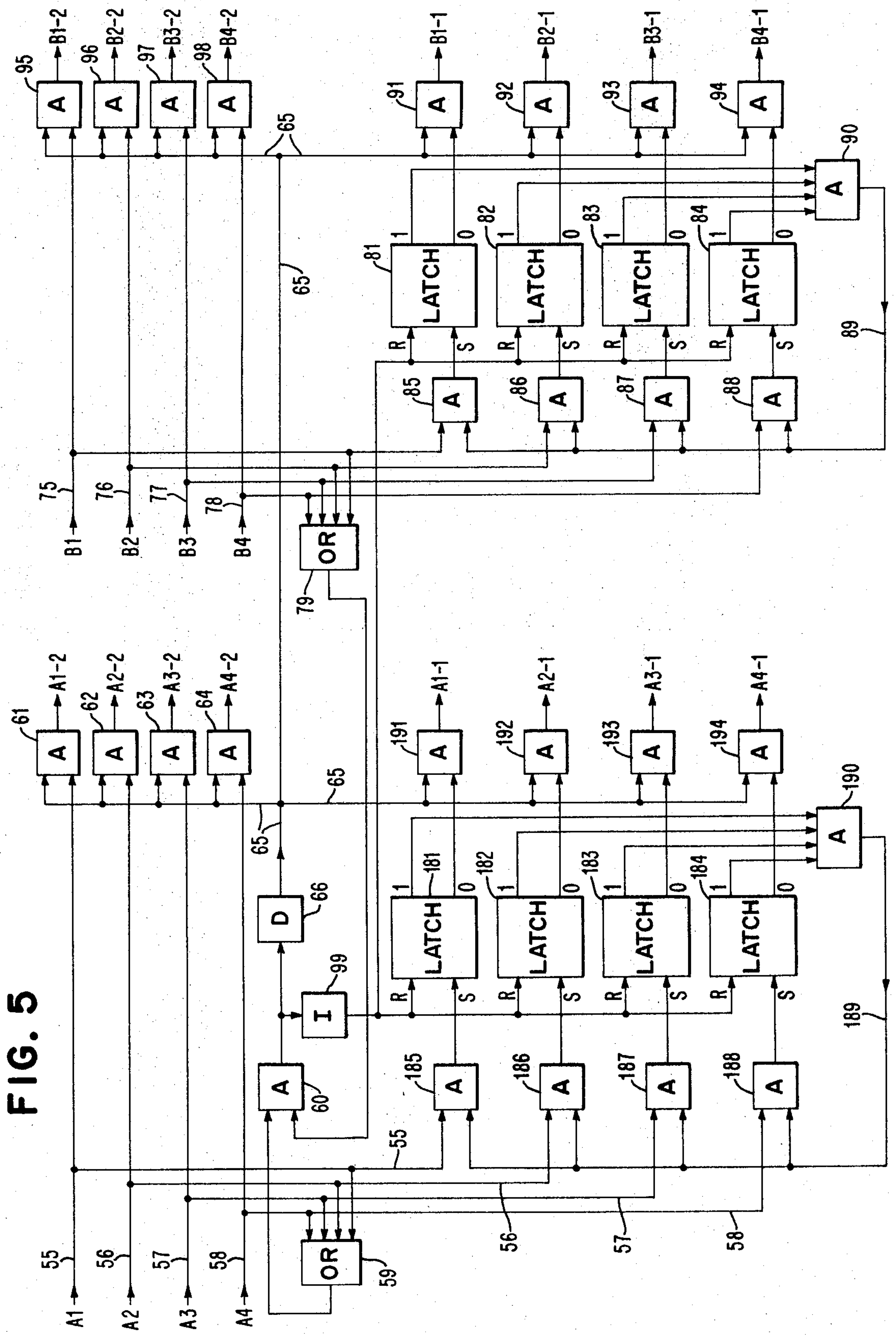
FIG 5 shows a splitter for connection to the output of a parallel tone receiver for splitting A–A–B–B tones.

FIG. 5 shows a splitter which in general is the same as the splitter of FIG. 4 with the exception that it is adapted to split or decode an A–A–B–B parallel tone input on lines 55—58 and 75–78 respectively.

The difference from the splitter of FIG. 4 is that there are four latches 181—184 with input AND's 185—186 from A input lines 55—58 for storing the first A tone of a double sequential A tone for each character, and there is a reset checking AND 190 which via line 189 enables the input AND's 185—188 whenever all of the latches 181—184 have been reset by the end of signal or false signal inverter 99.

AND's 191—194 are connected to provide A–1–1 to A–4–1 outputs when the delay completion output from delay circuit 66 is received via line 65, indicating that both A and both B tones should have been received and all outputs of the splitter can now be enabled.

THere are of course now 16 output lines from the 16 AND's.

While only two embodiments have been shown for each of the transmitter and the splitter; it is to be understood that these are presently preferred embodiments of the broad concepts embodied in this invention.

While the invention has been particularly shown and described with reference to the preferred embodiments thereof, it will be understood by those skilled in the art that the foregoing and other changes in form and details may be made therein without departing from the spirit and scope of the invention.

What we claim is:

1. A parallel tone transmitter comprising a plurality of means for operating a pair of oscillators selectively to produce predetermined pairs of tones, means for automatically changing the earlier frequency of one of each of said pairs of tones to a later frequency during the interval of generation of a chained sequential character commenced by one of each of said predetermined pairs, said earlier frequency changing to said later frequency after a predetermined interval, substantially without an intracharacter gap interval between the earlier and later frequencies, whereby a continuous chained sequential character is generated.

2. A parallel tone character code transmission system wherein each character is transmitted in a character interval, comprising:

means for generating one tone of each of a plurality of sets of tones simultaneously during a character interval, and means for completing a character by chaining a substitution of tones in only one set during a character interval.

3. A multiple frequency split character code transmission system comprising:

means for generating a plurality of sets of tones, means for varying at least one tone of each set during an interval of substantially continuous tone transmission to complete a character, substantially without an intracharacter gap in said sets of tones during said interval, means for receiving a character comprising means for providing a different signal for each tone of each set, means for assuring continuous presence of at least one tone of each set for a minimum interval of time in excess of the period of an unwanted interfering signal to be suppressed, means for storing an indication of the presence of a signal representing a tone present during only the initial interval of a character period, and means for presenting an indication of said signals representing the tones of each set in parallel at outputs determined in accordance with sequential order and sets simultaneously including said indication stored in said means for storing.

4. Apparatus for splitting parallel tones comprising a first set of inputs adapted to be coupled to a first set of outputs in a first frequency range of a parallel tone receiver, a second set of inputs adapted to be coupled to a second set of outputs in a second frequency range of a parallel tone receiver, means for assuring continuity of at least one signal in each set for a minimum interval of time, means for storing the identity of the initial output of one of said oscillators, and means for providing signals indicative of the identity of each of the tones received by said apparatus during said minimum interval of time including a separate signal indicative of the identity of said initial output and the subsequent output of one of said oscillators during said minimum interval of time.

5. A method of parallel tone transmission comprising:

generating a first one of a first set of tones and a first one of a second set of tones, changing the tone of at least one of said sets after a minimum time interval to a subsequent and separate tone, transmitting said tones, and receiving and decoding said tones and splitting the responses to the first ones of the first and second sets of tones and the response to the subsequent tone to provide one output of at least three response signals in parallel if and only if there is a continuity of at least one tone and its overhang and the equivalent thereof in each set during a minimum interval, substantially without an intracharacter gap between tones at the instant of said changing of said tone.

6. A method of parallel tone transmission comprising:

generating *y* tones, each of which is selected from a separate set of *y* sets of tones, whereby *y* is a positive integer greater than one, for each character, changing a tone in *n* of said sets to provide a sequential tone change during a character interval, where *n* is a positive integer, substantially without a tonal hiatus during changing of the tones.

7. A method in accordance with claim 6 wherein:

the resultant tones are transmitted over a communications channel capable of transmitting parallel tones, and receiving said tones and splitting said tones to provide *y* *n* parallel outputs for each character.

8. A method of parallel tone transmission comprising generating a character comprising at least one of a set of A tones and one of a set of B tones, where A tones include tones having frequencies of 697, 770, 852, and 941 cycles per second and B tones include tones having frequencies 1209, 1336, 1477 and 1633 cycles per second, and sequentially varying at least one of the A tones or B tones during generation of each character to provide at least three tones for each character, splitting said parallel sequential tone characters to provide a parallel output of said tones including measuring continuity by determining the continuous presence of an A tone and a B tone, timing for determining that continuity provided is in excess of a minimum duration, and providing all outputs in parallel for all tones received during each character interval when those conditions are satisfied.

9. Apparatus for processing sequential-parallel, complex character signals including:

first means for receiving a first set of input signals;

second means for receiving a second set of input signals;

duration means for assuring substantial signal continuity for a minimum duration, means for storing indications of the identity of initial portions of sequential characters for said second set of input signals, said means for storing being coupled to said second means, and means for coupling output signals to outputs from said first and second means for receiving input signals and said means for storing signals for a character, in response to an output from said duration means, said output signals being indicative of the identity of said input signals and being converted from sequential to parallel output by character.

10 Apparatus for processing sequential-parallel, complex character signals including:

first means for receiving a first set of input signals;

second means for receiving a second set of input signals;

duration means for assuring substantial continuity of reception of a signal in at least one of said sets for a minimum duration, means for storing indications of the identity of initial portions of sequential characters for said second set of input signals, said means for storing being coupled to said second means, and means for coupling output signals to outputs from said means for receiving input signals and said means for storing signals, said output signals being indicative of the identity of all said input signals for a character, in parallel, in response to an output from said duration means.

11. Apparatus for processing sequential-parallel complex character signals including:

first means for receiving a first set of inputs, second means for receiving a second set of inputs, duration means for determining that there is substantial continuity of reception of a signal in at least one of said first and second means for a minimum duration and for providing an output indicative thereof, means for storing indications of the identity of the initial portions of sequential characters for one of said sets of input signals, and means for coupling output signals to outputs from said means for receiving input signals and said means for storing signals, said output signals being indicative of the identity of said input signals for a character in response to said output from said duration means, said sequential-parallel complex character signals being converted to parallel output by character.

12. A sequential-parallel to parallel conversion system comprising A input means, B input means, B storage means, an A output means for coupling said A input means to said A output means, a first B output and a second B output, means for coupling an input signal received by said B input means to said B storage means and second means for coupling the contents of said B storage means to said first B output in response to a gating signal, and means for timing reception of an input signal having substantial continuity for a minimum interval couple to one of said input means and operative to provide said gating signal at its output coupled to said second means for coupling at the end of said minimum interval, means for coupling said B input means to said second B output.

13. Apparatus for processing parallel-sequential character representing signals consisting of a first set of input signals and a second set of input signals wherein a character time period consists of a first portion and a sequential second portion and a character representation consists of a signal of said first set during the entire time period and a signal of said second set during said first portion of said time period, and sequential signal of said second set during said second portion of said time period, input means for receiving parallel-sequential signals, storing means for storing signals of said second set received during said first portion of said time period, said storing means being coupled to said input means, output means for said signals, continuity means for detecting and indicating substantial continuity of a signal during said entire character time period, said continuity means being coupled to said input means, and coupling means responsive to said continuity means, when said substantial continuity is detected, for assuring coincident output by said output means during said second portion of said time period of a signal indicative of said first set of both signals indicative of said second set, said output means being coupled to said input means and said storing means by said coupling means in response to said continuity means.

14. Apparatus for processing parallel-sequential character representing signals consisting of a first set of input signals and a second set of input signals wherein a character time period consists of a first portion and a sequential second portion and a character representation consists of a signal of said first set during the entire time period and a signal of said second set during said first portion of said time period, and a sequential signal of said second set during said second portion of said time period, wherein said sequential signals of said second set may be the same during both portions of said time period, input means for receiving said first set of signals;

input means for receiving said second set of signals;

means for storing signals of said second set received during said first portion of said time period, first output means for signals of said first set, second output means for stored signals of said second set, third output means for said sequential signals of said second set, means for detecting and indicating substantial continuity of a signal during said entire character time period, means responsive to said detecting and indicating means, when said substantial continuity is detected, for assuring coincident output during said second portion of said time period of signals from each of said first, second, and third output means.

15. Apparatus for processing parallel-sequential character representing signals consisting of a first set of input signals and a second set of input signals wherein a character time period consists of a first portion and a sequential second portion and a character representation consists of a signal of said first set during the entire time period and a signal of said second set during said first portion of said time period, and a sequential signal of said second set during said second portion of said time period, wherein said sequential signals of said second set may be the same during both portions of said time period, first input means for receiving said first set of signals, second input means for receiving said second set of signals, storage means for storing signals of said second set received during said first portion of said time period, said storage means being coupled to said second input means, first output means for signals of said first set, second output means for stored signals of said second set coupled to an output of said storage means, third output means for said sequential signal of said second set, continuity means for detecting and indicating substantial continuity of a signal during said entire character time period having an input coupled to said first and second means, means responsive to said continuity means, when said substantial continuity is detected, for providing coincident output during said second portion of said time period of signals from each of said first, second and third output means.

16. Apparatus in accordance with claim 11 wherein said first set of inputs has a normal duration of a full character interval, said second set of inputs have a normal duration of first and second portions of a character interval, said duration means is coupled to said first means to determine that there is substantial continuity in said first set of inputs for a full character interval, said means for storing being coupled to the said second means.

17. Apparatus in accordance with claim 16 wherein said duration means is coupled to said second means to determine that there is presence of a signal during said first and second portions of a character interval simultaneously with presence of an input to said first means.

18. A method of parallel tone transmission comprising:

operating a pair of oscillators selectively to produce predetermined pairs of tones, automatically changing the earlier frequency of one of each of said pairs of tones to a later frequency during the interval of generation of a chained sequential character commenced by one of each of said predetermined pairs, said earlier frequency changing to said later frequency after a predetermined interval, substantially without an intracharacter gap interval between the earlier and later frequencies, whereby a continuous chained sequential character is generated.

19. A method of parallel tone character code transmission wherein each character is transmitted in a character interval, comprising:

generating one tone of each of a plurality of sets of tones simultaneously during a character interval, completing a character by chaining a substitution of tones in only one set during a character interval.

20. A system in accordance with claim 2 wherein each said character is transmitted substantially without an intracharacter gap interval coincident with said chaining.

21. A method in accordance with claim 19 wherein each said character is transmitted substantially without an intracharacter gap interval coincident with said chaining.

PO-1050
(5/69)

UNITED STATES PATENT OFFICE
CERTIFICATE OF CORRECTION

Patent No. 3,582,895 Dated February 2, 1972

Inventor(s) Paul Abramson; George R. Stilwell, Jr.

It is certified that error appears in the above-identified patent and that said Letters Patent are hereby corrected as shown below:

In the Patent:

Column 7 line 65 "producing" should be -- providing --

In the Application:

Page 22 line 3 States "providing"

In the Patent:

Column 7 line 75 "tone" should be -- true --

In the Application:

Page 22 line 15 States "true"

In the Patent:

Column 8 line 45 "signals on lines A-1, B-1-1" should be -- signals on lines A-1 through A-4, B-1-1 --

In the Application:

Page 24 line 10 States "on lines A-1 through A-4, B-1-1 --

PO-1050
(5/69)

UNITED STATES PATENT OFFICE
CERTIFICATE OF CORRECTION

Patent No. 3,582,895 Dated February 2, 1972

Inventor(s) Paul Abramson; George R. Stilwell, Jr.

It is certified that error appears in the above-identified patent and that said Letters Patent are hereby corrected as shown below:

In the Patent:

Claim 7 line 9 "y n" should be

-- y + n --

In the Applicatnon:

Claim 7 line 7 States "y + n"

Signed and sealed this 16th day of May 1972.

(SEAL)
Attest:

EDWARD M.FLETCHER,JR.
Attesting Officer

ROBERT GOTTSCHALK
Commissioner of Patents